(12) United States Patent
Owens

(10) Patent No.: US 6,263,584 B1
(45) Date of Patent: Jul. 24, 2001

(54) ALIGNMENT APPARATUS AND METHOD OF USING SAME

(76) Inventor: Barry S. Owens, 2228 Sandown Dr., Lawrenceville, GA (US) 30043

( * ) Notice: Subject to any disclaimer, the term of this patent is extended or adjusted under 35 U.S.C. 154(b) by 0 days.

(21) Appl. No.: 09/130,845

(22) Filed: Aug. 6, 1998

Related U.S. Application Data

(60) Provisional application No. 60/055,047, filed on Aug. 8, 1997.

(51) Int. Cl.[7] .................................................. B27G 23/00
(52) U.S. Cl. .......................... 33/640; 33/286; 33/DIG. 1; 33/DIG. 21
(58) Field of Search ............................... 33/281–286, 290, 33/292, 293, 613, 626, 628, 640, 641, 645, DIG. 21, 1 N, 1 DD, 340–343, 347, 354, 370–71, 534, DIG. 1; 83/435.14, 520, 471.3; 356/250

(56) References Cited

U.S. PATENT DOCUMENTS

| | | | |
|---|---|---|---|
| D. 398,867 | * | 9/1998 | Taylor ................................ 33/471 |
| 3,845,565 | * | 11/1974 | Newswanger ........................ 33/282 |
| 4,023,908 | * | 5/1977 | Johnson et al. ..................... 33/293 |
| 4,257,297 | * | 3/1981 | Nidbella ............................ 83/471.3 |
| 4,335,523 | * | 6/1982 | Bryant ............................... 33/371 |
| 4,779,354 | * | 10/1988 | Hill .................................... 33/640 |
| 4,843,728 | * | 7/1989 | Francis ............................... 33/640 |
| 4,976,046 | * | 12/1990 | Lee et al. ........................... 33/640 |
| 5,063,679 | * | 11/1991 | Schwandt .......................... 33/347 |
| 5,121,553 | * | 6/1992 | Boerder .............................. 33/640 |
| 5,121,554 | | 6/1992 | Havins ................................ 33/640 |
| 5,187,877 | * | 2/1993 | Jory et al. .......................... 33/640 |
| 5,285,708 | | 2/1994 | Bosten et al. ...................... 83/520 |
| 5,375,495 | | 12/1994 | Bosten et al. ...................... 83/520 |
| 5,446,635 | | 8/1995 | Jehn ................................... 362/259 |
| 5,491,906 | * | 2/1996 | Reilly ................................. 33/640 |
| 5,495,784 | * | 3/1996 | Chen .................................. 33/640 |
| 5,531,031 | * | 7/1996 | Green ................................. 33/286 |
| 5,539,990 | | 7/1996 | Le ...................................... 33/283 |
| 5,546,670 | * | 8/1996 | Chiang .......................... 33/DIG. 1 |
| 5,594,993 | | 1/1997 | Tager et al. ....................... 33/227 |
| 5,604,987 | * | 2/1997 | Cupp .............................. 33/DIG. 21 |
| 5,632,096 | * | 5/1997 | Horvath ............................. 33/640 |
| 5,675,899 | * | 10/1997 | Webb ................................. 83/520 |
| 5,735,054 | * | 4/1998 | Cole .................................... 33/640 |
| 5,836,081 | * | 11/1998 | Orosz, Jr. ...................... 33/DIG. 21 |
| 5,836,694 | * | 11/1998 | Nguyen ......................... 33/DIG. 21 |
| 5,842,282 | * | 12/1998 | Ting ............................... 33/DIG. 21 |
| 5,864,956 | * | 2/1999 | Dong ................................. 33/286 |
| 5,912,733 | * | 6/1999 | Dunlop et al. .................... 356/250 |
| 5,979,283 | * | 11/1999 | Osborne ........................ 83/435.14 |
| 6,012,229 | * | 1/2000 | Shiao ............................. 33/DIG. 21 |
| 6,073,532 | * | 6/2000 | English .............................. 33/640 |
| 6,101,733 | * | 8/2000 | Horvath ............................. 33/640 |
| 6,163,969 | * | 12/2000 | Jan et al. ............................ 33/286 |
| 6,166,802 | * | 12/2000 | Kodaira et al. ................... 33/293 |

* cited by examiner

*Primary Examiner*—Diego Gutierrez
*Assistant Examiner*—Yaritza Guadalupe
(74) *Attorney, Agent, or Firm*—Thomas, Kayden, Horstemeyer & Risley LLP

(57) ABSTRACT

An apparatus and method for configuring the angular alignment of a device or apparatus, such as a table saw blade. Specifically, the present invention includes a housing unit containing a light source for generating an optic marker, preferably a planar beam, a mechanism by which the housing unit is attached to the apparatus to be aligned, and a scaled protractor for calculating the angular relationship in degrees.

8 Claims, 7 Drawing Sheets

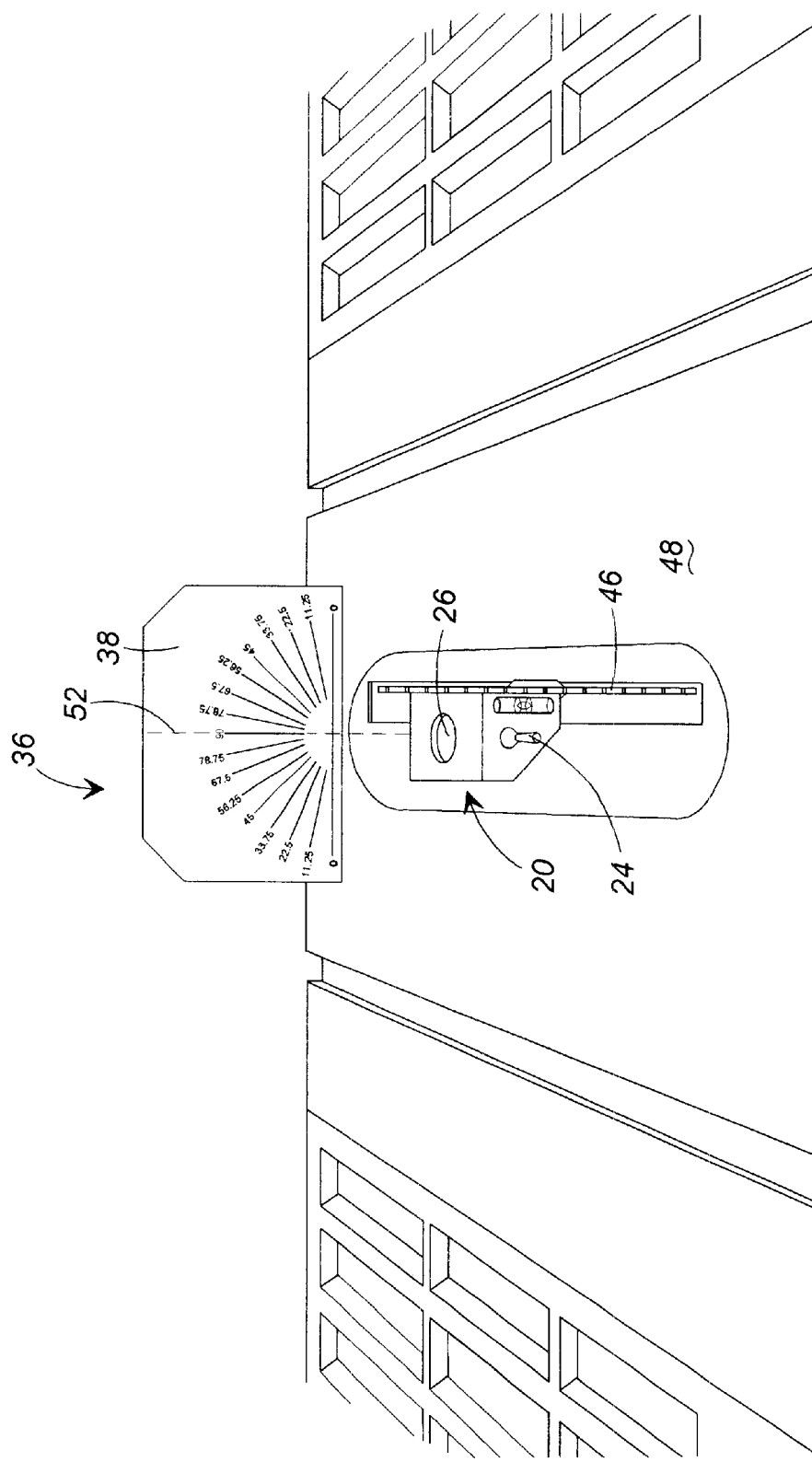

ALIGNMENT APPARATUS AND METHOD OF USING SAME

CROSS REFERENCE TO RELATED APPLICATIONS

This application claims the benefit of U.S. Provisional Application No. 60/055,047, entitled "ALIGNMENT APPARATUS AND METHOD OF USING SAME," filed Aug. 8, 1997 which is incorporated herein by reference.

BACKGROUND OF THE INVENTION

The present invention relates generally to the field of alignment systems, and, more particularly to alignment systems that use optics to define an alignment reference.

Today, many common power tools found in a hobbyist's workshop or basement as well as production type commercial tools come with some type of alignment guides for assisting the operator in using the tool at a desired angle. Depending on the expense of the tool, many of these alignment guides can be relatively crude requiring the operator to expend substantial time in developing a "custom" system for calculating angles and performing an alignment, such as aligning a table saw blade to make an angled cut. It is not uncommon for several practice cuts to be made before an accurate alignment is obtained.

The art is filled with examples of apparatus for aligning power tools to perform a variety of operations. For example, U.S. Pat. No. 5,121,554 to Havins discloses a miter gauge apparatus for use with conventional power saws. Havins' invention uses a protractor and a set of gages positioned about the radius of the protractor to position the saw blade physically at the correct cutting angle. A variable angle protractor is disclosed in U.S. Pat. No. 4,779,354 to Hill in which the protractor includes a reference base and a pivoting member that engages the apparatus to be aligned and moves in concert therewith to establish a desired angle of alignment.

Because of the accuracy of laser optics, several alignment systems incorporate an optic component that defines a target for the tool. U.S. Pat. No. 5,446,635 to Jehn discloses a laser assembly that projects a line of light onto a workpiece to guide a cutting instrument. Similarly, U.S. Pat. Nos. 5,285,708 and 5,375,495 to Bosten et al. disclose miter saws that use a laser to project an alignment marker on the workpiece to guide the blade.

U.S. Pat. No. 5,539,990 to Le and U.S. Pat. No. 5,594,993 to Tager et al. disclose instruments incorporating a laser for projecting reference lines for use as an alignment guide. Nevertheless, these instruments do have their shortcomings, particularly in aligning the reference line with the horizontal or vertical axis. Specifically, Le uses a plumb and support system to achieve a precise alignment with the vertical axis. Because Le's instrument must be positioned in a way that allows the plumb to hang properly, it may not be suitable for some applications in which the instrument cannot be oriented in the required configuration. The hand-held builder's tool disclosed by Tager et al. uses either a screw-thread mechanism or a cam-operated mechanism to align the reference line with a reference axis or plane.

While these inventions are useful for their intended purposes, they often require extensive modifications to existing equipment. Moreover, when the optic marker is projected onto the workpiece, the tool itself can sometimes obscure the marker as the tool engages the workpiece. This can result in a loss of accuracy as the operator attempts to align the operative component of the tool with the optic marker. Mechanisms used to calibrate the optic marker with a reference axis or plane have limited the applications in which the alignment apparatus can be used or require the use of a tool to carry out the calibration.

Accordingly, there exists a need for an alignment apparatus that is both versatile (i.e., can be used with multiple types of tools, machines, or other devices), and uses laser optics to perform the alignment of the apparatus apart from the workpiece. It is further desired that the alignment apparatus be capable of calibration with respect to a reference axis or plane without requiring additional tools.

SUMMARY OF THE INVENTION

Certain advantages and novel features of the invention will be set forth in the description that follows and will become apparent to those skilled in the art upon examination of the following or may be learned with the practice of the invention.

To achieve the advantages and novel features, the present invention is generally directed to an apparatus and method for configuring the angular alignment of a device or apparatus, such as a table saw blade. Specifically, the present invention includes a housing unit containing a light source (e.g., a laser) for generating an optic marker, preferably a planar beam, means by which the housing unit is attached to the apparatus to be aligned (e.g., the saw blade), and a scaled protractor for calculating the angular relationship in degrees.

In accordance with an aspect of the present invention, a magnet is used to mount the housing unit to the apparatus to be aligned thus providing a flexible attachment mechanism requiring no tools or additional parts.

In accordance with another aspect of the present invention, the protractor has degree markings on both sides. On one side, the degree markings occur every 11.25°, which is a common measurement in woodworking. On the other side, the degree markings occur every 1° as is customary in a traditional protractor. Moreover, the protractor is a separate component in the alignment system and can be positioned either horizontally or vertically in relation to a reference plane for performing compound alignments.

In accordance with yet another feature of the present invention, the housing unit includes means for attaching the unit to a support where the light beam can be aimed to produce an optic marker for use as a general purpose reference. One or more levels are attached to the housing to align the optic marker by assessing the conformity of the housing with respect to the horizontal and/or vertical axes.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which:

FIG. 3 illustrates the housing unit and protractor of FIGS. 1A, 1B, 2A, and 2B used to align a table saw blade for a 90° cut;

DETAILED DESCRIPTION OF THE PREFERRED EMBODIMENT

Figure 1A:
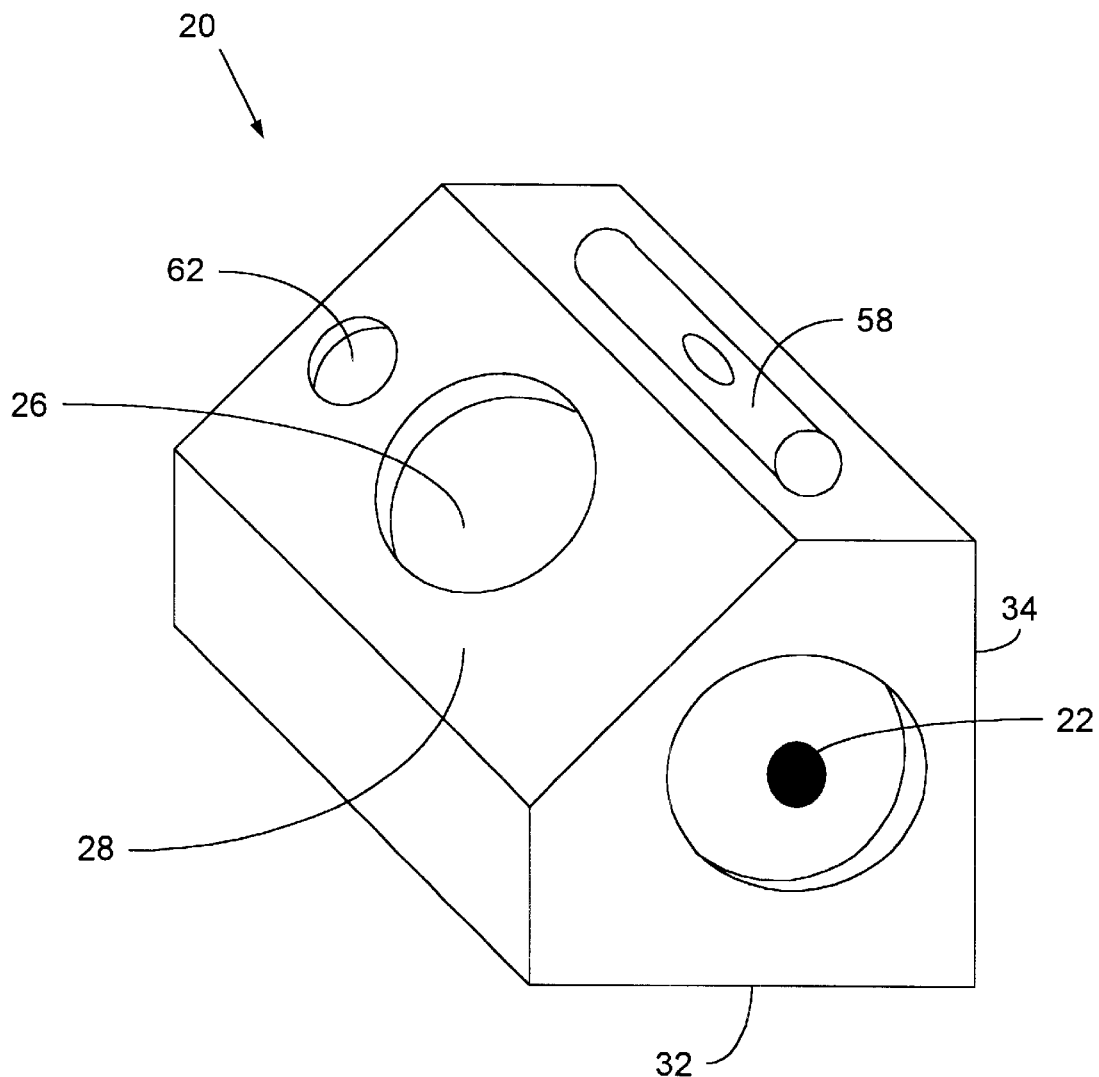
FIGS. 1A and 1B provide perspective views of an optic marker housing unit according to the present invention.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the claims.

Figure 1B:
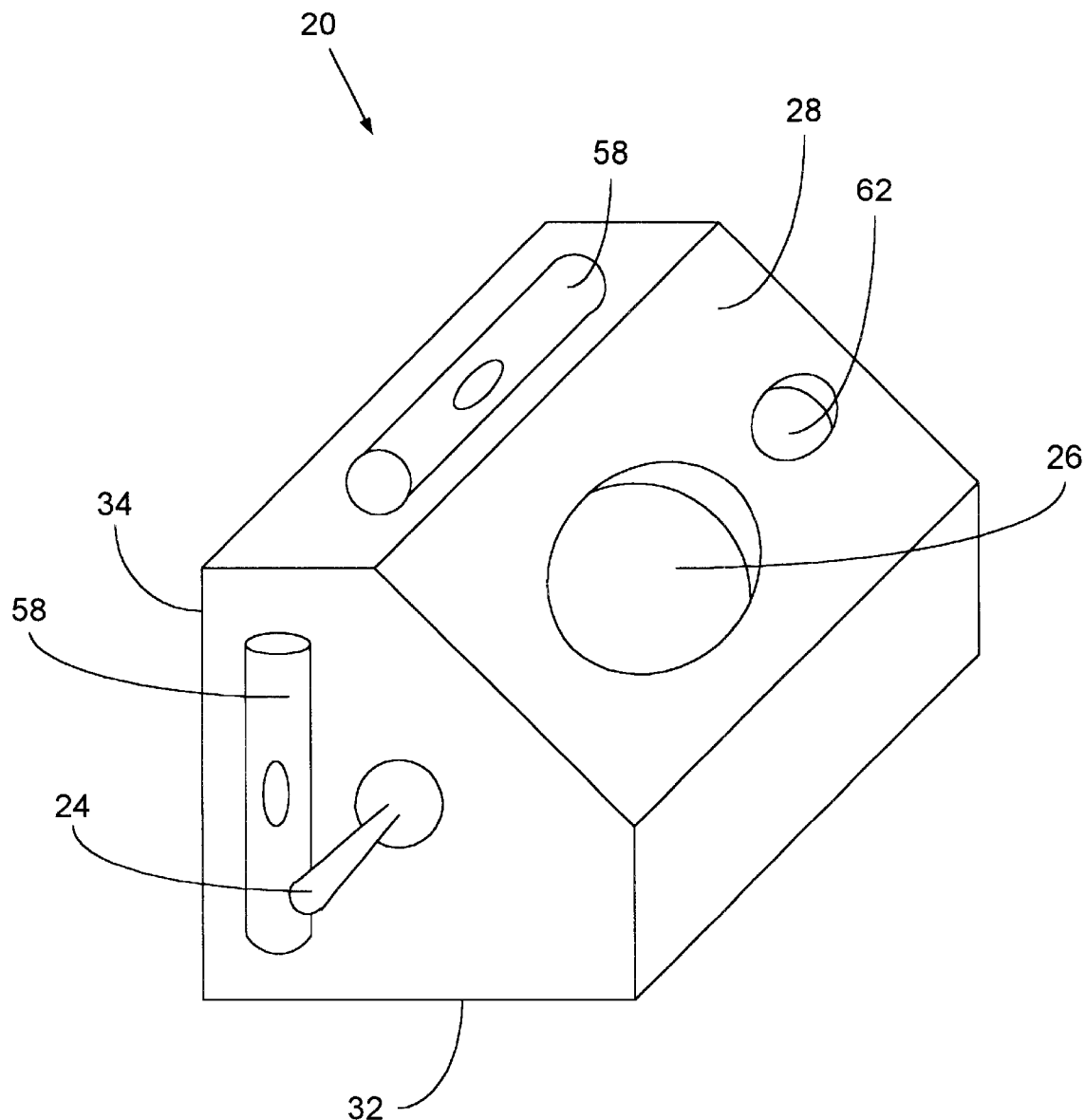

Referring now to FIGS. 1A and 1B, two perspective views of an optic marker housing unit 20 according to the present invention are shown. Housing unit 20 is manufactured from a suitable rigid material, such as aluminum, steel, plastic or other polymer material. The geometry of housing unit 20 should be chosen so that it will accommodate a laser or light source 22, a battery (not shown), and a switch 24. In the preferred embodiment, laser 22 operates on a low voltage power supply, such as a battery, and projects a line for use as an optic marker. Switch 24 is used to turn laser or light source 22 on and off.

Suitable means should be chosen to attach the housing unit to the apparatus to be aligned. For metallic apparatus, magnets 26 as shown in FIGS. 1A and 1B are preferred as they provide both a secure attachment mechanism and great versatility in locating the housing unit on the apparatus. In the embodiment shown, all three sides 28, 32, and 34 include a recessed magnet for maximum versatility in positioning housing unit 20 on a host apparatus. Alternative means, including additional structure, such as clips, slots, clamps or screws can be used for non-metallic apparatus.

Figure 2A:
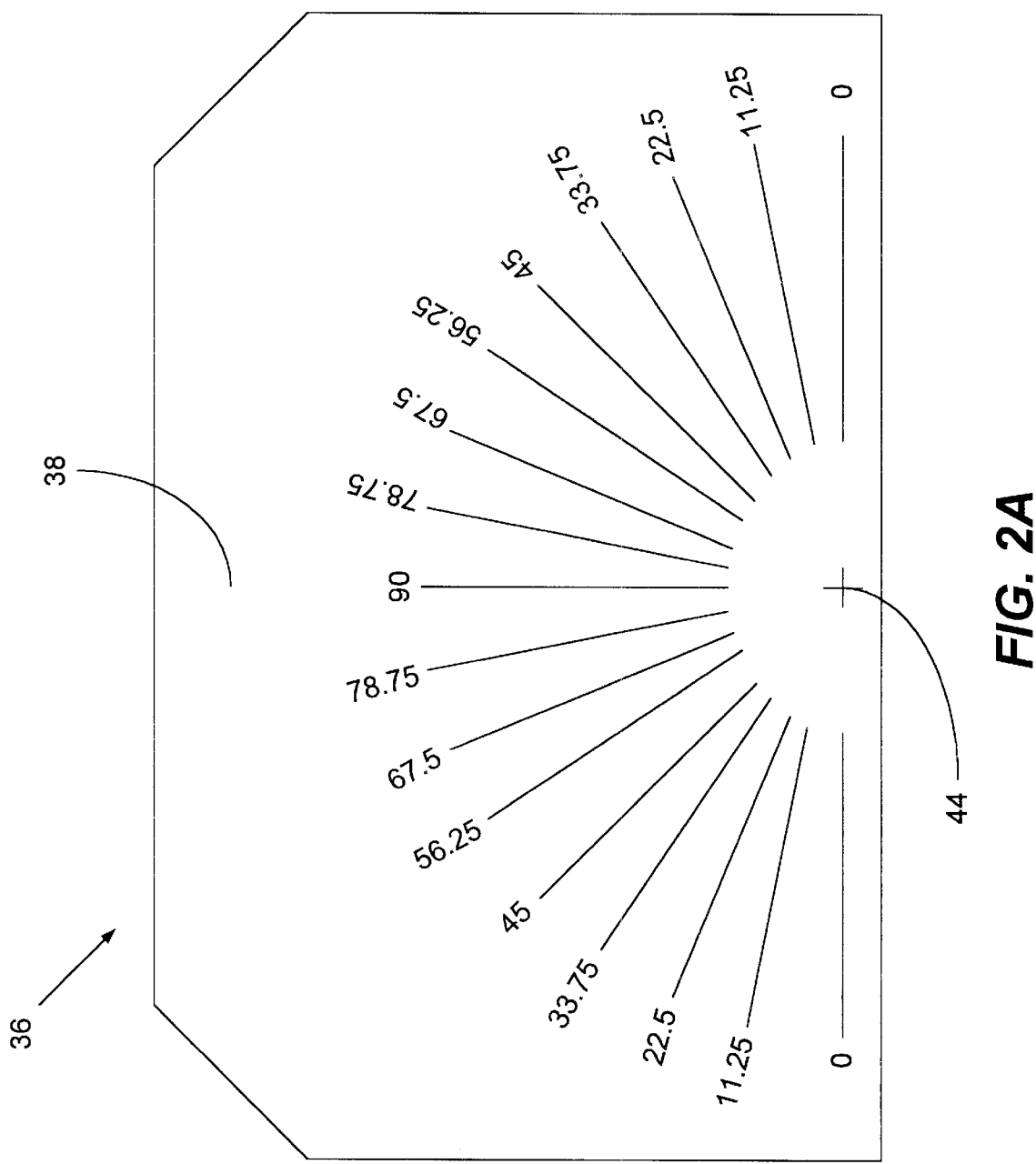
FIGS. 2A and 2B illustrate a protractor for use with the housing unit of FIGS. 1A and 1B.
Figure 2B:
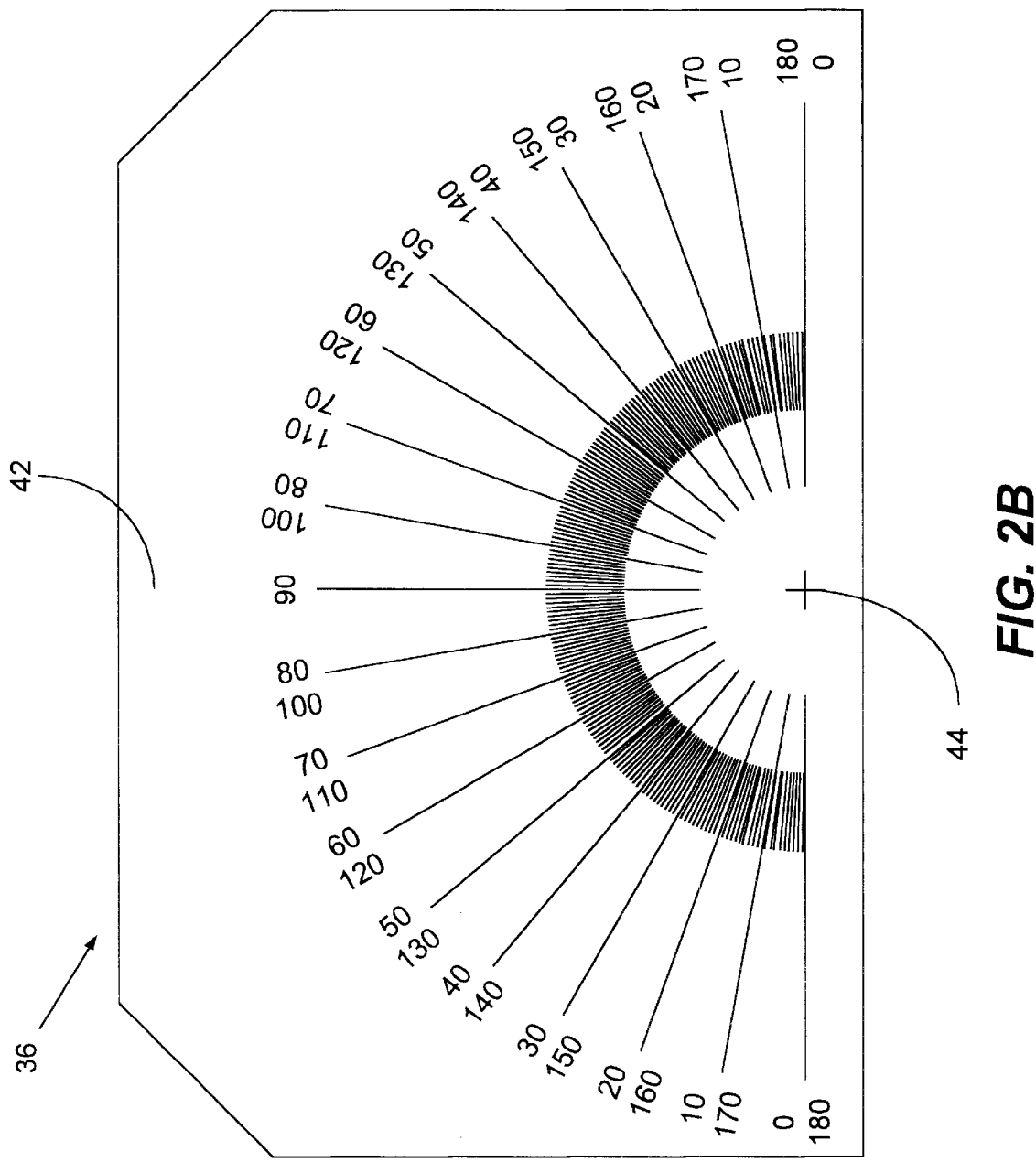

To perform an alignment, housing unit 20 is attached to the apparatus to be aligned and laser or light source 22 is aimed towards a scaled protractor 36, as illustrated in FIGS. 2A and 2B. On one side or face 38, protractor 36 contains a 180° semi-circle with degree markings every 11.25° as shown in FIG. 2A. This division is chosen because multiples of 11.25° are common angles in woodworking applications. Preferably, however, protractor 36 will include standard 1° markings about a semi-circle on its opposite side or face 42 as shown in FIG. 2B. This double sided arrangement provides convenience for woodworking applications, and detail where accuracy and precision are paramount.

Protractor 36 further includes a mid-point 44 defined by two crossing lines at the center of the semi-circle. Lines extend from each degree marker towards mid-point 44 to facilitate the calculation of an angle on protractor 36.

Figure 4:
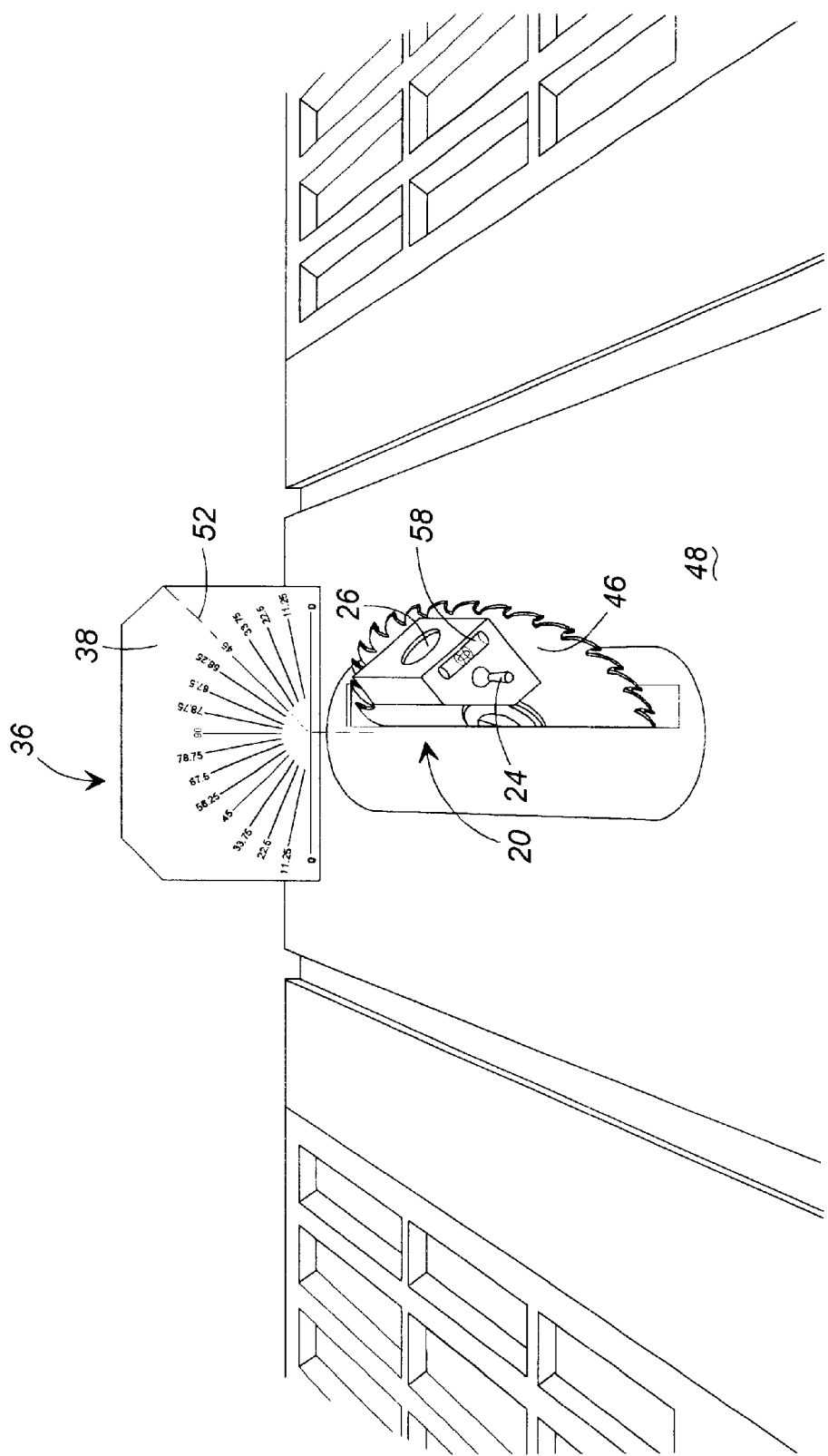
FIG. 4 illustrates the housing unit and protractor of FIGS. 1A, 1B, 2A, and 2B used to align a table saw blade for a 45° cut.

FIG. 3 illustrates the operation of housing unit 20 and laser or light source 22 with protractor 36. In the example shown, housing unit 20 is attached to a table saw blade 46 via a magnet. Protractor 36 is positioned perpendicular to the table surface 48, which serves as a reference plane for the alignment. Laser 22 is activated and an optic marker, in the form of line 52, is projected onto protractor 36. Protractor 36 is then positioned so that line 52 intersects mid-point 44 defined on the side or face 38 of protractor 36. In this position, the line 52 projected onto protractor 36 indicates the angle of the saw blade 46 in relation to the reference plane, which in this case is table surface 48. The operator will then reposition the angle of blade 46 while simultaneously watching the line 52 projected onto protractor 36 until the desired angle is reached. FIG. 4 shows saw blade 46 repositioned to cut at a 45° angle as indicated by line 52 on side 38 of protractor 36. Once aligned, protractor 36 and housing unit 20 can be removed and a workpiece can be cut at the previously established angle. It should be appreciated that the alignment takes place apart from the actual operation on the workpiece, the disadvantages of which were discussed in the foregoing.

Figure 5:
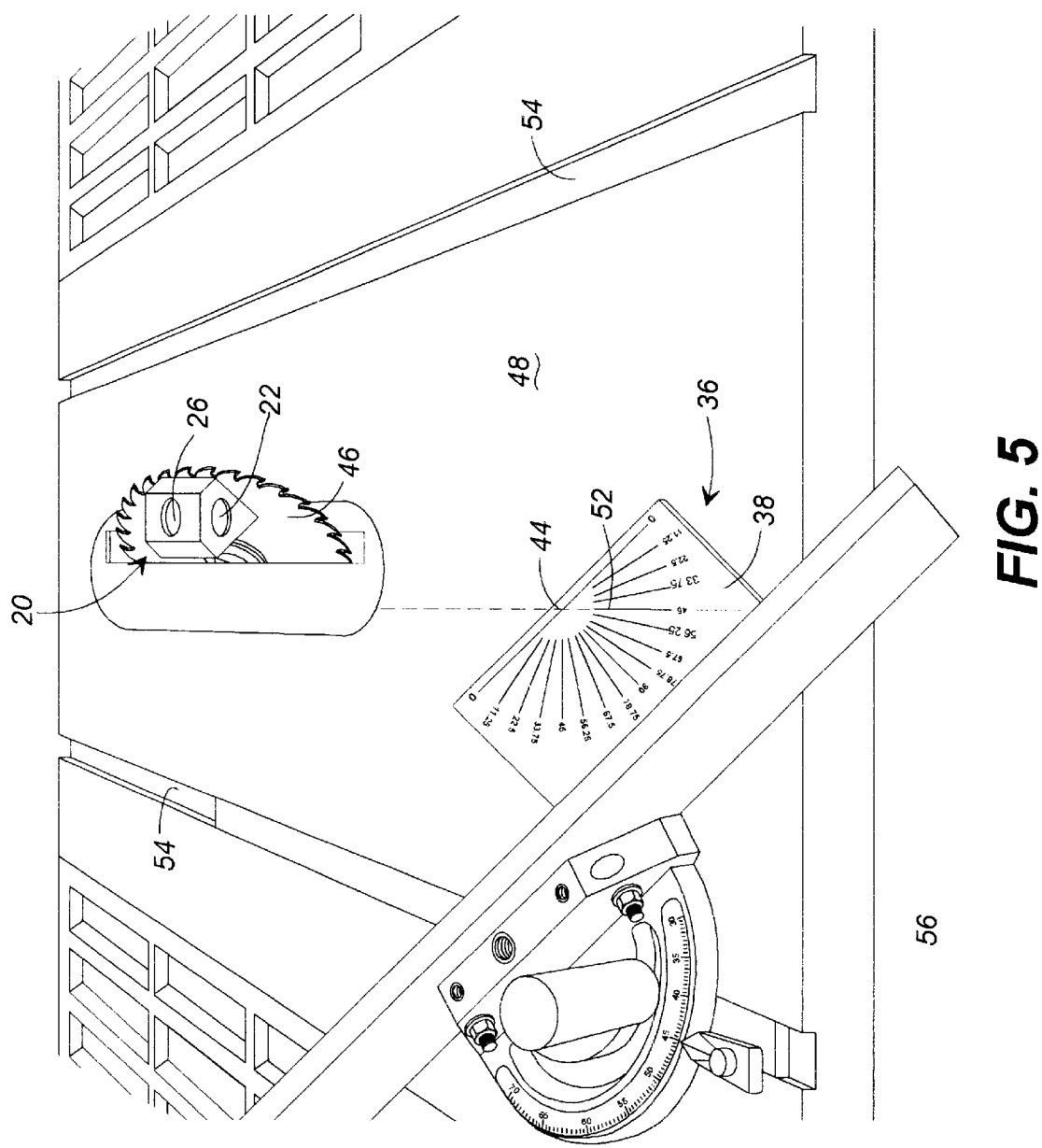
FIG. 5 illustrates the housing unit and protractor of FIGS. 1A, 1B, 2A, and 2B used to align a table saw blade for a compound miter cut.

A second type of angular alignment is illustrated in FIG. 5. Similar to FIG. 3, housing unit 20 is attached to a table saw blade 46. The table surface 48 includes miter tracks or slots 54 in which miter attachment 56 is located. In this example, protractor 36 is positioned substantially planar with table surface 48, which serves as the reference plane. By positioning protractor 36 with its mid-point 44 intersecting line 52 generated by laser 22 and its top edge flush against miter attachment 56 (or up against the workpiece as shown in FIG. 5), the operator can adjust miter attachment 56 until the line projected onto protractor 36 equals the desired angle.

By combining the alignment approach illustrated in FIG. 5 with the approach illustrated in FIGS. 3 and 4, apparatus can be aligned at compound angles. For example, in FIG. 5, saw blade 46 is initially aligned to cut at a 45° angle using the approach discussed hereinbefore with reference to FIGS. 3 and 4. Once this alignment is complete, the workpiece is aligned to receive saw blade 46 at a 45° angle as discussed previously with reference to FIG. 5.

In addition to the alignment of apparatus discussed hereinbefore, the present invention can be used as a general purpose alignment guide or apparatus. With reference to FIGS. 1A and 1B, housing unit 20 contains one or two single axis levels 58 or a single dual axis level attached to its outer surface via suitable means. These levels 58 allow housing unit 20 to be leveled with respect to the horizontal and/or vertical axes. Advantageously, the operator can determine through a simple visual verification of levels 58 whether housing unit 20 is in proper calibration or alignment with the reference axes or planes without requiring any additional tools or complex calibration steps.

Housing unit 20 preferably contains apertures 62 drilled into its sides to allow housing unit 20 to be mounted to a support, such as the mounting post of a tripod or transit. In this configuration, the operator can select the desired orientation of housing unit 20 (i.e., angular, horizontal, or vertical) and laser or light source 22 will project an optic marker that can be used as a general purpose reference. For example, a reference line generated by laser 22 can be used for hanging drop ceilings, laying flooring materials, placing wall studs, installing dry wall, placing pipes and installing wall coverings.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

I claim:
1. An alignment system comprising:
    an apparatus having a table and a blade, the table having a substantially planar table surface, the blade being configured to engage and shape a workpiece, the blade being angularly displaceable relative to the table surface such that a workpiece engaging the table surface and caused to engage the blade is shaped by the blade in a manner corresponding to a displacement angle of the blade relative to the table surface; and a housing unit having:
  a light source for producing a planar beam of light confined therein;
  at least one mounting member configured to mount the housing to the blade of the apparatus;
  at least one indicator member on the housing for indicating a proper axial alignment of the housing relative to the blade of the apparatus upon which it is mounted; and
  an angle indicating member having a planar face with degrees of angle marked along the planar face, the angle indicating member being positioned on the table surface of the apparatus and in relation to the housing unit such that the light source projects an elongated optic marker on the planar face for facilitating an angular measurement, the angular measurement corresponding to the displacement angle of the blade relative to the table surface.

2. The apparatus alignment system of claim 1 wherein said housing unit has an outer surface and said mounting member comprise:
  a magnet embedded into said outer surface of said housing unit.

3. The apparatus alignment system of claim 1, wherein said angle indicating member has a mid-point, a first side and a second side, said first side having said degree markings every 11.25°, said second side having said degree markings every 1°.

4. The apparatus alignment system of claim 3, further comprising:
  a plurality of lines on said first side, each said line corresponding to a unique said degree marking and extending from said unique degree marking towards said mid-point.

5. The apparatus alignment system of claim 1, wherein said apparatus includes a reference plane and wherein said angle indicating member is positioned substantially planar with said reference plane.

6. The apparatus alignment system of claim 1, wherein said apparatus includes a reference plane and wherein said angle indicating member is positioned substantially perpendicular with said reference plane.

7. The apparatus system of claim 1 wherein said optic marker is a line.

8. A method for aligning an apparatus comprising the steps of:
  providing an apparatus having a planar surface and a shaping member, the shaping member having a flat surface and being configured to engage and shape a workpiece, the flat surface of the shaping member being angularly displaceable relative to the planar surface such that a workpiece engaging the planar surface and caused to engage the shaping member is shaped by the shaping member in a manner corresponding to a displacement angle of the flat surface of the shaping member relative to the planar surface;
  providing a light source for generating a linear optic marker defining a plane;
  mounting the light source to the flat surface of the shaping member of the apparatus such that the plane of the optic marker is parallel with the flat surface of the shaping member of the apparatus;
  providing a protractor having a semi-circle with degrees of angle marked along the semi-circle; and
  positioning the protractor in relation to the light source such that the light source projects the optic marker on the semi-circle thereby facilitating an angular measurement of the angular position of the flat surface of the shaping member relative to the planar surface.

* * * * *